(12) United States Patent
Koide

(10) Patent No.: US 9,093,043 B2
(45) Date of Patent: Jul. 28, 2015

(54) DISPLAY DEVICE AND ELECTRONIC APPARATUS

(71) Applicant: Japan Display Inc., Tokyo (JP)

(72) Inventor: Gen Koide, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 4 days.

(21) Appl. No.: 14/089,226

(22) Filed: Nov. 25, 2013

(65) Prior Publication Data

US 2014/0146094 A1 May 29, 2014

(30) Foreign Application Priority Data

Nov. 28, 2012 (JP) .................. 2012-260389

(51) Int. Cl.
*G09G 3/36* (2006.01)
*G02F 1/1362* (2006.01)

(52) U.S. Cl.
CPC ........ *G09G 3/3648* (2013.01); *G02F 1/136286* (2013.01); *G02F 2001/136295* (2013.01); *G09G 2300/0426* (2013.01); *G09G 2300/0456* (2013.01); *G09G 2300/0465* (2013.01)

(58) Field of Classification Search
CPC ...................................................... G09G 3/36
USPC ............. 345/690; 349/110, 40, 106, 153, 105
See application file for complete search history.

(56) References Cited

U.S. PATENT DOCUMENTS

| 8,102,489 B2* | 1/2012 | Kim ............................... 349/110 |
| 2004/0109102 A1* | 6/2004 | Chang et al. .................... 349/44 |
| 2010/0020256 A1* | 1/2010 | Lee et al. ........................ 349/39 |

FOREIGN PATENT DOCUMENTS

JP 2004-014982 1/2004

* cited by examiner

*Primary Examiner* — Olga Merkoulova
(74) *Attorney, Agent, or Firm* — K&L Gates LLP

(57) ABSTRACT

According to an aspect, a display device includes a display area portion in which first line segments and second line segments intersect each other and are arranged in a grid to form a non-open portion that divides a light-transmitting opening into open portions, and the open portions form pixels arranged in a matrix. Metal layers are formed on a color filter in the display area portion and disposed in positions overlapping the non-open portion. A metal layer having the largest area in areas overlapping the first line segments among metal layers is the same as a metal layer having the largest area in areas overlapping the second line segments among those of metal layers, and is formed of a metal layer having the highest reflectance among the metal layers.

8 Claims, 15 Drawing Sheets

543 DISPLAY UNIT
542 KEYBOARD
541 BODY

551 UPPER HOUSING
554 DISPLAY
552 LOWER HOUSING

UPPER HOUSING
551

552
LOWER HOUSING

552
LOWER HOUSING

551
UPPER HOUSING

LOWER HOUSING
552

553
CONNECTION UNIT

551
UPPER HOUSING

UPPER HOUSING
551

552
LOWER HOUSING

DISPLAY DEVICE AND ELECTRONIC APPARATUS

CROSS REFERENCES TO RELATED APPLICATIONS

The present application claims priority to Japanese Priority Patent Application JP 2012-260389 filed in the Japan Patent Office on Nov. 28, 2012, the entire content of which is hereby incorporated by reference.

BACKGROUND

1. Technical Field

The present disclosure relates to a display device including liquid crystals. The present disclosure also relates to an electronic apparatus that includes the display device including the liquid crystals.

2. Description of the Related Art

Recent years have seen a growing demand for display devices for use in mobile devices such as mobile phones and electronic paper. Such a display device includes a display area portion in which pixels are arranged in a matrix, a vertical drive circuit that selects the pixels in the display area portion row by row, and a horizontal drive circuit that supplies an image signal to each of the pixels of a row selected by the vertical drive circuit.

Wirings connected to the vertical drive circuit and the horizontal drive circuit are arranged in the display area portion of the display device. Arranging the wirings in an overlapping manner on a black matrix formed in a grid on a color filter can prevent the wirings from being visible from a display surface of the display device.

In a technique disclosed in Japanese Patent Application Laid-open Publication No. 2004-14982 (JP-A-2004-14982), a display device is described that includes thin film transistors in each of which source, drain, and gate electrodes, an organic semiconductor layer, and an insulation layer are disposed in a desired structure using substantially transparent materials on a transparent substrate, and also includes wirings composed of a substantially transparent conductive material that have electrical contacts with the transistors.

In recent years, display devices are required to have higher definition. An increase in the definition of the display device leads to an increase in the pixels, which, in turn, increases the wirings, leading to an increase in a space for arranging the wirings. This increases an occupation ratio of the wirings on the display panel, leading to a reduction in a ratio of an opening as a light transmitting area, that is, an aperture ratio. The reduction in the aperture ratio of the display device leads to a reduction in a quantity of light transmittable through the display panel relative to a quantity of light emitted from a light source.

To cope with this, the display device disclosed in JP-A-2004-14982 obtains a high aperture ratio by making the electrodes from transparent electrodes of ITO or the like so as to make the wirings invisible. However, with the configuration in which the black matrix is disposed on the color filter, the black matrix limits the aperture ratio. Therefore, in the above configuration, there is a limit in the improvement in the aperture ratio even if the transparent electrodes are used for all of the electrodes.

For the foregoing reasons, there is a need for a display device that can efficiently use light emitted from a backlight and an electronic apparatus including the display device.

SUMMARY

According to an aspect, a display device includes: a display area portion in which a plurality of first line segments extending in a first direction and a plurality of second line segments extending in a second direction intersecting the first direction intersect each other and are arranged in a grid to form a non-open portion that divides a light-transmitting opening into open portions, and the open portions divided by the non-open portion in a matrix form pixels arranged in a matrix; a vertical drive circuit that applies vertical scan pulses to scan lines and selects pixels in the display area portion row by row; and a horizontal drive circuit that supplies an image signal to each of the pixels of a row selected by the vertical drive circuit. The display area portion includes: a color filter in which a colored filter is arranged corresponding to the open portions of the pixels; and a plurality of metal layers that are formed on the color filter and disposed in positions overlapping the non-open portion when viewed from a surface of the display area portion. A metal layer having the largest area in areas overlapping the plurality of first line segments among the plurality of metal layers is the same as a metal layer having the largest area in areas overlapping the plurality of second line segments among the plurality of metal layers. The metal layer that has the largest area in the areas overlapping the plurality of first line segments and the largest area in the areas overlapping the plurality of second line segments is formed of a metal layer having the highest reflectance among the plurality of metal layers.

According to another aspect, an electronic apparatus have the display device and a control device that supplies an input signal to the display device. The display device includes: a display area portion in which a plurality of first line segments extending in a first direction and a plurality of second line segments extending in a second direction intersecting the first direction intersect each other and are arranged in a grid to form a non-open portion that divides a light-transmitting opening into open portions, and the open portions divided by the non-open portion in a matrix form pixels arranged in a matrix; a vertical drive circuit that applies vertical scan pulses to scan lines and selects pixels in the display area portion row by row; and a horizontal drive circuit that supplies an image signal to each of the pixels of a row selected by the vertical drive circuit. The display area portion includes: a color filter in which a colored filter is arranged corresponding to the open portions of the pixels; and a plurality of metal layers that are formed on the color filter and disposed in positions overlapping the non-open portion when viewed from a surface of the display area portion. A metal layer having the largest area in areas overlapping the plurality of first line segments among the plurality of metal layers is the same as a metal layer having the largest area in areas overlapping the plurality of second line segments among those of the plurality of metal layers. The metal layer that has the largest area in the areas overlapping the plurality of first line segments and the largest area in the areas overlapping the plurality of second line segments is formed of a metal layer having the highest reflectance among the plurality of metal layers.

Additional features and advantages are described herein, and will be apparent from the following Detailed Description and the figures.

DETAILED DESCRIPTION

An embodiment for implementing the present disclosure will be described in detail with reference to the attached drawings. The description of the embodiment below will not limit the present disclosure. The constituent elements described below include elements easily envisaged by those skilled in the art and substantially identical elements. The constituent elements described below can also be combined as appropriate. The description will be made in the following order.

1. Embodiment (display device)
2. Application examples (electronic apparatus)

Figure 1:
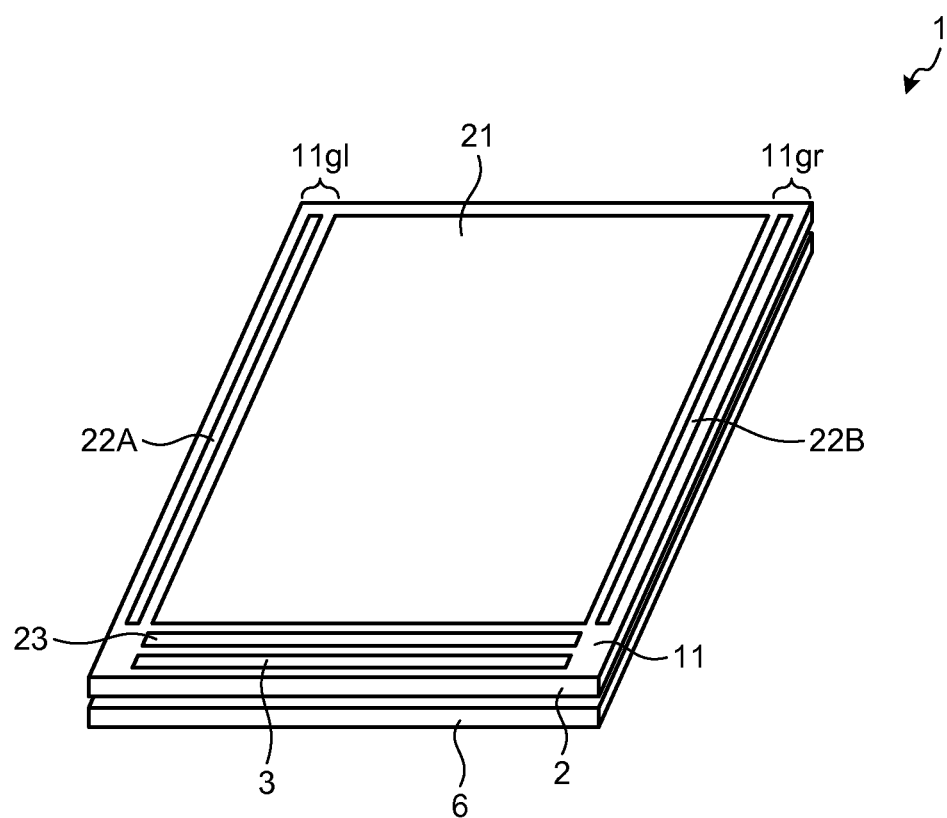
FIG. 1 is an explanatory diagram illustrating an example of a configuration of a display device according to an embodiment of the present disclosure.
Figure 2:
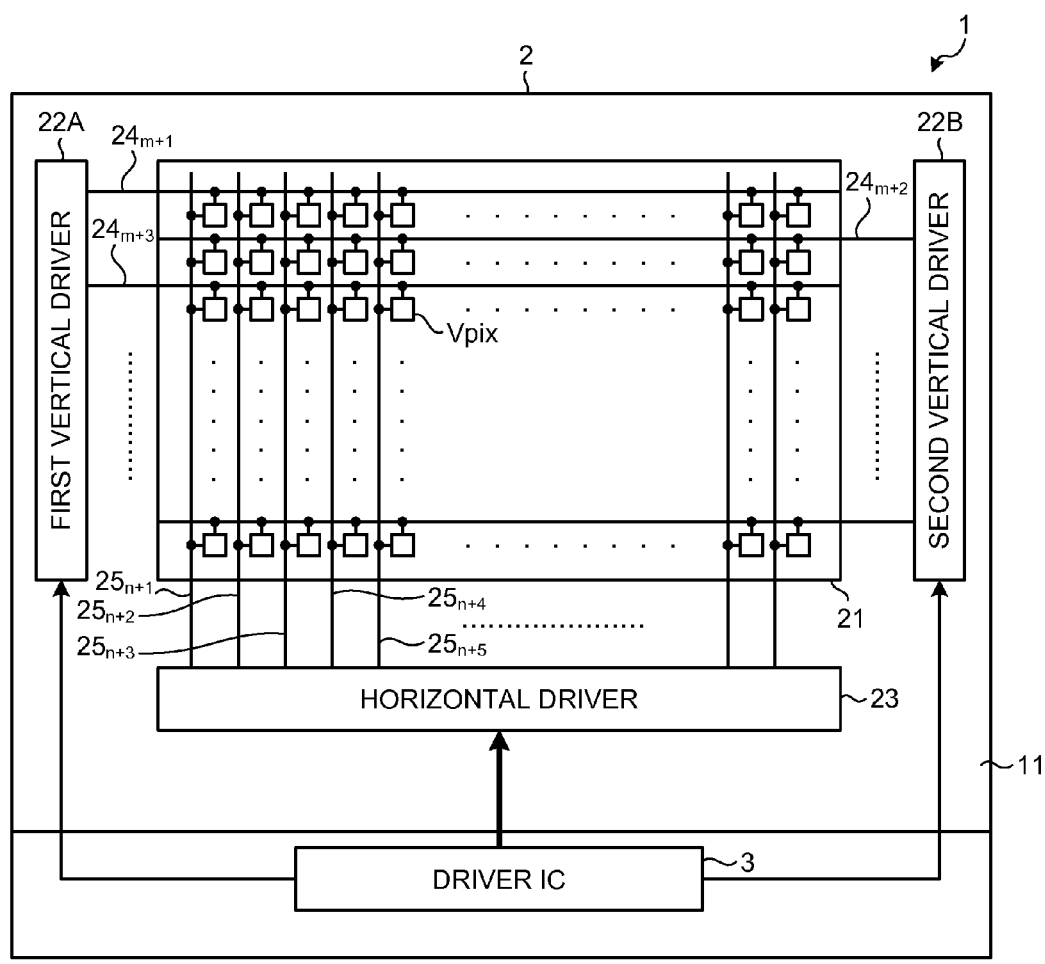
FIG. 2 is a block diagram illustrating an example of a system configuration of the display device of FIG. 1.

Examples in which a display device according to the embodiment mentioned above is applied to an electronic apparatus 3. Aspects of present disclosure 1. Embodiment Display Device 1-1. Configuration FIG. 1 is an explanatory diagram illustrating an example of a configuration of the display device according to the embodiment. FIG. 2 is a block diagram illustrating an example of a system configuration of the display device of FIG. 1. FIG. 1 is a schematic illustration, and does not necessarily represent actual dimensions and shapes. A display device 1 corresponds to a specific example of the "display device" of the present disclosure.

The display device 1 is a transmissive or transflective liquid crystal display device, and includes a display panel 2, a driver IC 3, and a backlight 6. Flexible printed circuits (FPC), which are not illustrated, transmit external signals to the driver IC 3 and drive power to drive the driver IC 3. The display panel 2 includes a transparent insulating substrate, such as a glass substrate 11; a display area portion 21 that lies on the glass substrate 11 and includes a plurality of pixels arranged in a matrix, the pixels including liquid crystal cells; a horizontal driver (horizontal drive circuit) 23; and vertical drivers (vertical drive circuit) 22A and 22B. The vertical drivers (vertical drive circuit) 22A and 22B are arranged as the first vertical driver 22A and the second vertical driver 22B so as to have the display area portion 21 interposed therebetween. The glass substrate 11 is composed of a first substrate on which a plurality of pixel circuits including active elements (such as transistors) are arranged and formed in a matrix, and of a second substrate that is arranged so as to be opposed to the first substrate with a predetermined gap therebetween. The gap between the first and the second substrates is filled with liquid crystals.

Frame edges 11*gr* and 11*gl* of the display panel 2 are non-display areas that are not occupied by the display area portion 21 lying on the glass substrate 11 and including the pixels arranged in a matrix, the pixels including the liquid crystal cells. The vertical drivers 22A and 22B are disposed on the frame edges 11*gr* and 11*gl*.

The backlight 6 is disposed on the back surface (surface on the opposite side of the surface to display an image) of the display panel 2. The backlight 6 emits light toward the display panel 2 and irradiates the whole surface of the display area portion 21 with the light. The backlight 6 includes, for example, a light source and a light guide plate that guides the light output from the light source and emits the light toward the back surface of the display panel 2.

1-2. System Configuration Example of Display Device

The display panel 2 includes, on the glass substrate 11, the display area portion 21, the driver IC 3 that has functions of an interface (I/F) and a timing generator, the first vertical driver 22A, the second vertical driver 22B, and the horizontal driver 23.

In the display area portion 21, pixels Vpix including liquid crystal layers have a matrix structure in which units each constituting one pixel in terms of display are arranged in m rows×n columns. In the present specification, the row refers to a pixel row including n pixels Vpix arranged in one direction. The column refers to a pixel column including m pixels Vpix arranged in a direction orthogonal to the direction in which the row is arranged. The values of m and n are determined according to a vertical display resolution and a horizontal display resolution. For the array of the pixels Vpix of m rows and n columns in the display area portion 21, scan lines $24_1, 24_2, 24_3, \ldots, 24_m$ are wired for the respective rows, and signal lines $25_1, 25_2, 25_3, \ldots, 25_n$ are wired for the respective columns. Hereinafter, the embodiment may represent the scan lines $24_1, 24_2, 24_3, \ldots, 24_m$ as scan lines 24, and may represent the signal lines $25_1, 25_2, 25_3, \ldots, 25_n$ as signal lines 25. The embodiment may also represent the scan lines $24_1, 24_2, 24_3, \ldots, 24_m$ as scan lines $24_{m+1}, 24_{m+2}, 24_{m+3}$, and the signal lines $25_1, 25_2, 25_3, \ldots, 25_n$ as signal lines $25_{n+1}, 25_{n+2}, 25_{n+3}$. The display area portion 21 is disposed in an area in which the scan lines 24 and the signal lines 25 overlap a black matrix 76a of a color filter when viewed from a direction orthogonal to a front surface. In the display area 21, areas in which the black matrix 76a is not placed are open portions 76b. This will be described later.

The display panel 2 is externally supplied with external signals, that is, a master clock, a horizontal synchronizing signal, and a vertical synchronizing signal, which are in turn supplied to the driver IC 3. The driver IC 3 convert the levels (increase the voltages) of the master clock, the horizontal synchronizing signal, and the vertical synchronizing signal having voltage amplitudes of an external power supply to voltage amplitudes of an internal power supply required to drive the liquid crystals, thus generating increased amplitude signals of the master clock, the horizontal synchronizing signal, and the vertical synchronizing signal. The driver IC 3 supplies the master clock, the horizontal synchronizing signal, and the vertical synchronizing signal thus generated to the first vertical driver 22A, the second vertical driver 22B, and the horizontal driver 23. The driver IC 3 generates, for pixel electrodes of the respective pixels Vpix, a common potential (counter electrode potential) VCOM to be given commonly to the pixels, and supplies the common potential VCOM to the display area portion 21.

The first vertical driver 22A and the second vertical driver 22B include each a shift register, to be described later, a latch circuit, and so on. In each of the first vertical driver 22A and the second vertical driver 22B, the latch circuit sequentially samples and latches display data output from the driver IC 3 in each of horizontal periods in a manner synchronized with vertical clock pulses. The first vertical driver 22A and the second vertical driver 22B sequentially output the digital data of one line latched in each of the latch circuits as a vertical scan pulse, and supplies the digital data to each of the scan lines $24_{m+1}, 24_{m+2}, 24_{m+3}, \ldots$ of the display area portion 21 so as to sequentially select the pixels Vpix row by row. The first vertical driver 22A and the second vertical driver 22B are arranged so as to have the scan lines $24_{m+1}, 24_{m+2}, 24_{m+3}, \ldots$ interposed therebetween in the extending direction of the scan lines $24_{m+1}, 24_{m+2}, 24_{m+3}, \ldots$ . The first vertical driver 22A and the second vertical driver 22B sequentially output the digital data to the scan lines $24_{m+1}, 24_{m+2}, 24_{m+3}, \ldots$, for example, starting from a relatively upper side in the upper direction of vertical scanning of the display area portion 21 down to a relatively lower side in the lower direction of vertical scanning of the display area portion 21. The first vertical driver 22A and the second vertical driver 22B can also sequentially output the digital data to the scan lines $24_{m+1}, 24_{m+2}, 24_{m+3}, \ldots$ starting from a relatively lower side in the lower direction of vertical scanning of the display area portion 21 up to a relatively upper side in the upper direction of vertical scanning of the display area portion 21.

The horizontal driver 23 is supplied with, for example, 6-bit digital video data Vsig of red (R), green (G), and blue (B). The horizontal driver 23 writes the display data via the signal lines 25 to the pixels Vpix of a row selected through the vertical scan by the first vertical driver 22A and the second vertical driver 22B, pixel by pixel, or a plurality of pixels at a time, or all pixels at a time.

1-3. Driving Method of Liquid Crystal Display Panel

Figure 3:
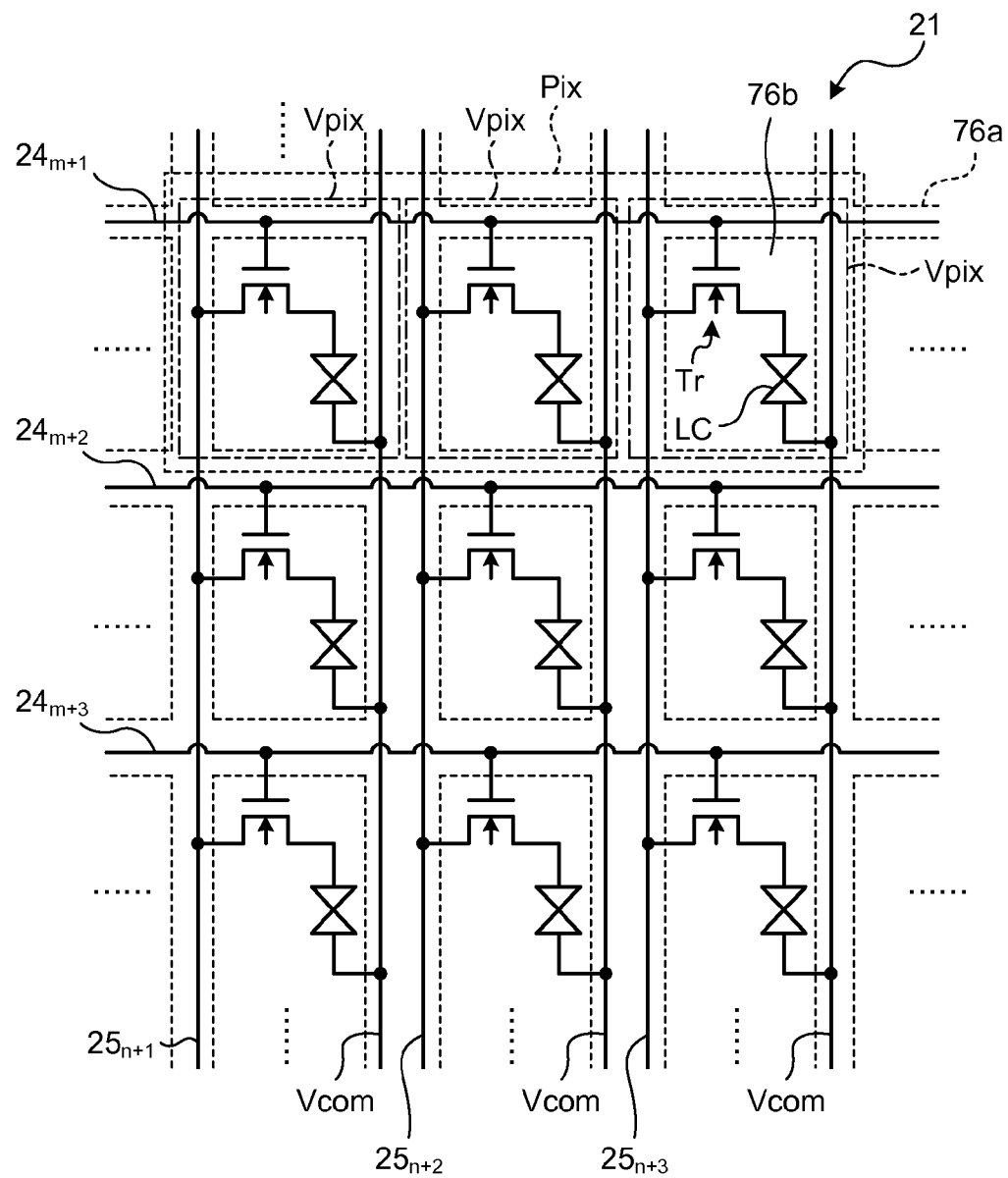
FIG. 3 is a circuit diagram illustrating an example of a drive circuit that drives pixels.

The display area portion 21 is formed with the wirings, such as the signal lines $25_{n+1}, 25_{n+2}, 25_{n+3}$ that supply pixel signals as the display data to thin-film transistor (TFT) elements Tr of the pixels Vpix, and the scan lines $24_{m+1}, 24_{m+2}, 24_{m+3}$ that drive the TFT elements Tr, as illustrated in FIG. 3. In this manner, the signal lines $25_{n+1}, 25_{n+2}, 25_{n+3}$ extend in a plane parallel to the surface of the glass substrate 11 described above, and supply the pixel signals for displaying an image to the pixels Vpix. The pixel Vpix includes the TFT element Tr and a liquid-crystal element LC. The TFT element Tr is composed of a thin-film transistor, and in the present example, composed of an n-channel metal oxide semiconductor (MOS) type TFT. Sources of the TFT elements Tr are connected to the signal lines $25_{n+1}, 25_{n+2}, 25_{n+3}$; gates thereof are connected to the scan lines $24_{m+1}, 24_{m+2}, 24_{m+3}$; and drains thereof are each connected to one end of the liquid-crystal element LC. One end of the liquid-crystal element LC is connected to the drain of the TFT element Tr, and the other end thereof is connected to a drive electrode Vcom.

The pixels Vpix are connected to the other pixels Vpix belonging to the same row of the display area portion 21 via each of the scan lines $24_{m+1}, 24_{m+2}, 24_{m+3}$. The odd-numbered scan lines $24_{m+1}, 24_{m+3}$ of the scan lines $24_{m+1}, 24_{m+2}, 24_{m+3}$ are connected to the first vertical driver 22A, and are supplied from the first vertical driver 22A with a vertical scan pulse Vgate of a scan signal, to be described later. The even-numbered scan lines $24_{m+2}, 24_{m+4}$ of the scan lines $24_{m+1}, 24_{m+2}, 24_{m+3}$ are connected to the second vertical driver 22B, and supplied from the second vertical driver 22B with the vertical scan pulse Vgate of the scan signal, to be described later. In this manner, the first vertical driver 22A and the second vertical driver 22B alternately apply the vertical scan pulses Vgate to the scan lines $24_{m+1}, 24_{m+2}, 24_{m+3}$ in the scan direction. The pixels Vpix are connected to the other pixels Vpix belonging to the same column of the display area portion 21 via each of the signal lines $25_{n+1}, 25_{n+2}, 25_{n+3}$. The signal lines $25_{n+1}, 25_{n+2}, 25_{n+3}$ are connected to the horizontal driver 23, and supplied with the pixel signals from the horizontal driver 23. The pixels Vpix are also connected to the other pixels Vpix belonging to the same column of the display area portion 21 via each of the drive electrodes Vcom. The drive electrodes Vcom are connected to a drive electrode driver, which is not illustrated, and supplied with drive signals from the drive electrode driver.

Each of the first vertical driver 22A and the second vertical driver 22B illustrated in FIGS. 1 and 2 applies the vertical scan pulse Vgate to the gates of the TFT elements Tr of the pixels Vpix via each of the scan lines $24_{m+1}, 24_{m+2}, 24_{m+3}$ illustrated in FIG. 3 so as to sequentially select one row (one horizontal line), to drive for display, of the pixels Vpix formed in a matrix in the display area portion 21. The horizontal driver 23 illustrated in FIGS. 1 and 2 supplies the pixel signals, via the signal lines $25_{n+1}, 25_{n+2}, 25_{n+3}$ illustrated in FIG. 3, to the respective pixels Vpix included in one horizontal line sequentially selected by the first vertical driver 22A and the second vertical driver 22B. Then, these pixels Vpix of one horizontal line perform display of one horizontal line according to the supplied pixel signals. The drive electrode driver applies the drive signals to drive the drive electrodes Vcom for each drive electrode block including a predetermined number of the drive electrodes Vcom.

As described above, in the display device 1, the first vertical driver 22A and the second vertical driver 22B drive the scan lines $24_{m+1}$, $24_{m+2}$, $24_{m+3}$ to sequentially perform scanning, and thereby sequentially select one horizontal line. Also, in the display device 1, the horizontal driver 23 supplies the pixel signals to the pixels Vpix belonging to the selected horizontal line, and thereby, the display is performed by each horizontal line. When this display operation is performed, the drive electrode driver applies the drive signals to the drive electrodes Vcom corresponding to the horizontal line.

In the display device 1, a continuous application of direct voltage of the same polarity to the liquid-crystal element LC can cause deterioration of, for example, a specific resistance (resistance value specific to a substance) of the liquid crystal. To prevent the deterioration of, for example, the specific resistance (resistance value specific to a substance) of the liquid crystal, the display device 1 employs a driving method in which the polarity of a video signal is inverted with respect to the common potential of the drive signals at a predetermined period.

There are known driving methods for a liquid-crystal display panel, such as line inversion, dot inversion, and frame inversion driving methods. The line inversion driving method is a driving method in which the polarity of the video signal is inverted at a period of time of 1 H (H is a horizontal period) corresponding to one line (one pixel row). The dot inversion driving method is a driving method in which the polarity of the video signal is inverted between pixels adjacent in up-down and right-left directions. The frame inversion driving method is a driving method in which the video signals written to all pixels in one frame corresponding to one screen are inverted at once into the same polarity. The display device 1 can employ any of the above-described driving methods.

Figure 4:
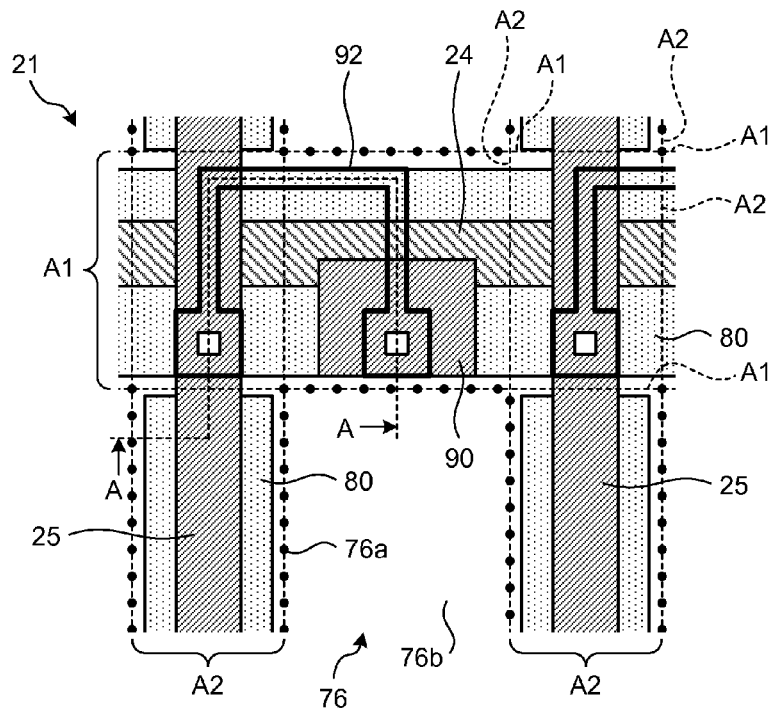
FIG. 4 is a front view illustrating a schematic configuration of a circuit pattern of the display device according to the embodiment.
Figure 5:
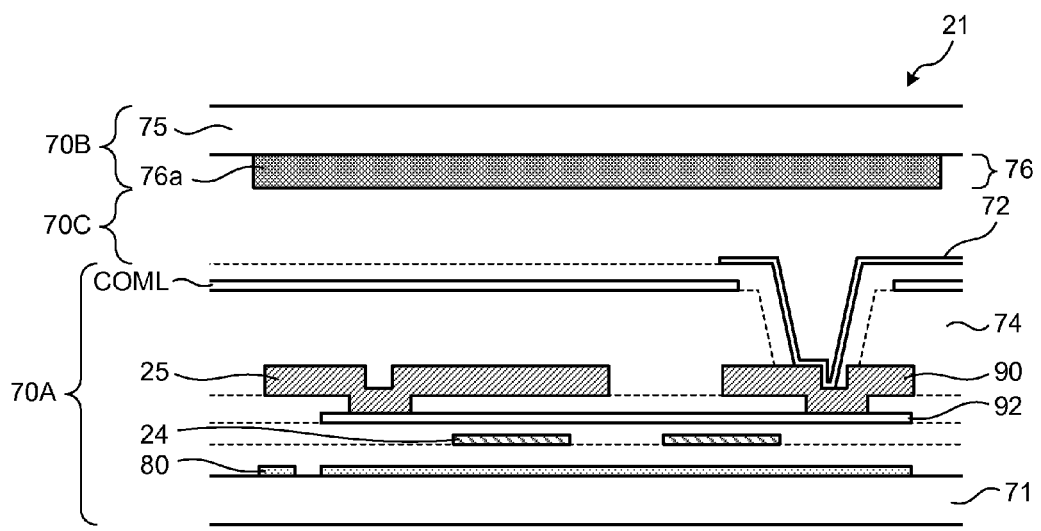
FIG. 5 is an A-A line sectional view of FIG. 4.
Figure 6:
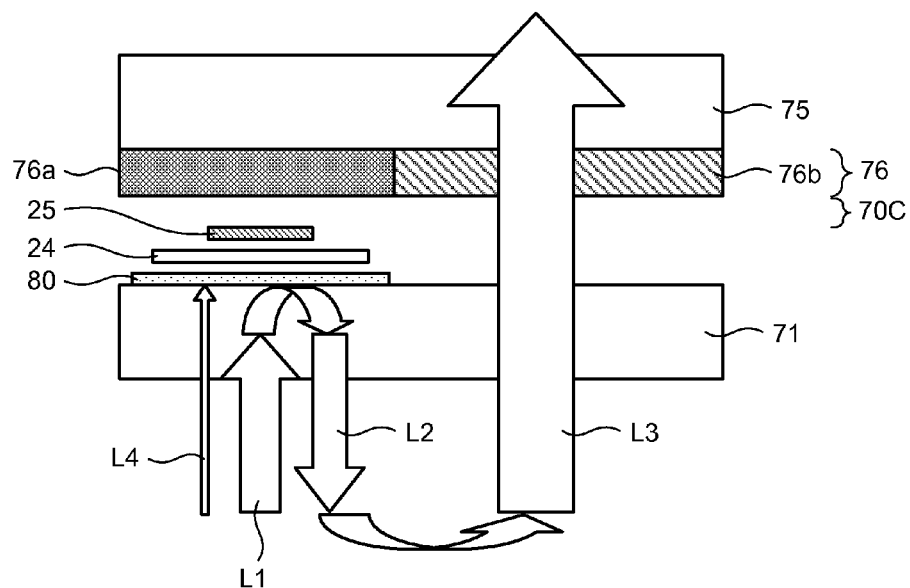
FIG. 6 is an explanatory diagram illustrating an example of a function of the display device.

A configuration of the display area portion 21 will next be described in detail. FIG. 4 is a front view illustrating a schematic configuration of a circuit pattern of the display device according to the embodiment. FIG. 5 is an A-A line sectional view of FIG. 4. FIG. 6 is an explanatory diagram illustrating an example of a function of the display device. As illustrated in FIG. 5, the display area portion 21 includes a pixel substrate 70A, a counter substrate 70B disposed so as to be opposed in the orthogonal direction to a surface of the pixel substrate 70A, and a liquid crystal layer 70C provided so as to be inserted between the pixel substrate 70A and the counter substrate 70B. The backlight 6 is disposed on a surface of the pixel substrate 70A opposite to the liquid crystal layer 70C.

The liquid crystal layer 70C modulates light passing through an electric field according to the state of the electric field, and uses liquid crystals of any of various modes, such as a twisted nematic (TN) mode, a vertical alignment (VA) mode, and an electrically controlled birefringence (ECB) mode. An orientation film may be interposed between the liquid crystal layer 70C and the pixel substrate 70A, and between the liquid crystal layer 70C and the counter substrate 70B, which are illustrated in FIG. 5.

The counter substrate 70B includes a glass substrate 75 and a color filter 76 formed on one surface of the glass substrate 75. The color filter 76 includes the black matrix 76a having a grid shape and open portions 76b. The black matrix 76a is formed so as to cover the outer circumferences of the pixels Vpix as illustrated in FIGS. 3 and 4. In other words, the black matrix 76a is disposed at boundaries between the two-dimensionally arranged pixels Vpix so as to have a grid shape. The black matrix 76a is formed of a material having a high rate of absorption of light. The open portions 76b are openings formed in the grid shape of the black matrix 76a, and are arranged corresponding to the pixels Vpix. The open portions 76b include color regions colored, for example, in three colors of red (R), green (G), and blue (B). The color regions colored, for example, in the three colors of red (R), green (G), and blue (B) are periodically arranged at the open portions 76b of the color filter 76, and one set of the color regions of the three colors of R, G, and B is associated, as a pixel Pix, with each of the pixels Vpix illustrated in FIG. 3. The color filter 76 is opposed to the liquid crystal layer 70C in a direction orthogonal to a TFT substrate 71. The color filter 76 may have a combination of other colors if colored in different colors. The color filter 76 generally gives the color region of green (G) a higher luminance than those of the color regions of red (R) and blue (B).

The pixel substrate 70A includes the TFT substrate 71 as a circuit substrate, a plurality of pixel electrodes 72 arranged in a matrix on the TFT substrate 71, a drive electrode COML formed between the TFT substrate 71 and the pixel electrodes 72, and an insulation layer 74 insulating the pixel electrodes 72 from the drive electrode COML. The drive electrode COML is a transparent electrode formed of a transparent conductive material (transparent conductive oxide), such as indium tin oxide (ITO).

The TFT substrate 71 is formed with layers of thin-film transistor elements 92 of the respective pixels Vpix described above, and of wirings, such as the signal lines 25 supplying the pixel signals to the pixel electrodes 72 and the scan lines 24 driving the TFT elements Tr. Insulation layers are formed between the thin-film transistor elements 92, the signal lines 25, and the scan lines 24 except at portions (contact holes) where the wirings come in contact with each other. In other words, the thin-film transistor elements 92, the signal lines 25, and the scan lines 24 are formed in different layers. The signal lines 25 extend in a plane parallel to a surface of the TFT substrate 71, and supply the pixel signals for displaying an image on the pixels. The thin-film transistor element 92 contacts, at a part thereof, the signal line 25, and contacts, at another part thereof, a wiring 90 formed in the same layer as that of the signal line 25. The thin-film transistor element 92 is connected to the pixel electrode 72 via the wiring 90. The wiring 90 is disposed in an area in which the black matrix 76a overlaps the scan line 24 between the signal lines 25.

As described above, the display area portion 21 is disposed in the area in which the scan lines 24 and the signal lines 25 overlap the black matrix 76a of the color filter 76 when viewed from a direction orthogonal to the front surface. The scan lines 24 and the signal lines 25 are linear wirings, and are arranged in directions substantially orthogonal to each other. In the embodiment, as illustrated in FIG. 4, a portion of the black matrix 76a extending in the direction along the scan line 24 (first direction) is denoted as a first line segment A1, and a portion of the black matrix 76a extending in the direction along the signal line 25 (second direction) is denoted as a second line segment A2. A portion of the first line segment A1 overlapping the second line segment A2 is formed as a closed area by connecting points where sides of the first line segment A1 overlap sides of the second line segment A2. In the same manner, a portion of the second line segment A2 overlapping the first line segment A1 is formed as a closed area by connecting points where the sides of the first line segment A1 overlap the sides of the second line segment A2.

A reflective layer 80 is formed on a surface of a base plate (plate-like member serving as a base) of the TFT substrate 71 of the embodiment. More specifically, the reflective layer 80 is disposed between the surface of the base plate of the TFT substrate 71 and the layer in which the scan lines 24 are arranged. In other words, the reflective layer 80 is disposed on the side of the surface of the TFT substrate 71 and nearest to the backlight 6. The reflective layer 80 is independent from the other layers, and is disposed in a floating state. The reflective layer 80 is formed of a film having a high reflection property made of, for example, silver (Ag), aluminum (Al), or an aluminum alloy (Al alloy). The reflective layer 80 of the embodiment is formed of a metal layer having a higher reflectance than those of a metal layer forming the scan line 24 and a metal layer forming the signal line 25.

As illustrated in FIG. 4, the reflective layer 80 is disposed in a substantially whole region of the area in which the black matrix 76a is disposed. In other words, the reflective layer 80 is disposed in a grid shape in the same manner as the black matrix 76a. Consequently, the reflective layer 80 is disposed both in areas overlapping the first line segments A1 and in areas overlapping the second line segments A2. The reflective layer 80 is formed with spaces at portions where the second line segments A2 intersects, in the extending direction thereof (second direction), the first line segments A1. The reflective layer 80 is segmented at the portions where the second line segments A2 intersects, in the extending direction thereof (second direction), the first line segments A1.

Among metal layers disposed between the TFT substrate 71 and the black matrix 76a in the display area portion 21, a metal layer having the largest area in the area overlapping the first line segment A1 forms the reflective layer 80, and a metal layer having the largest area in the area overlapping the second line segment A2 forms the reflective layer 80. In other words, the reflective layer 80 is a metal layer having the largest area in both the area overlapping the first line segment A1 that is the area overlapping the black matrix 76a in the first direction and the area overlapping the second line segment A2 that is the area overlapping the black matrix 76a in the second direction. The metal layers are layers in each of which a film such as a wiring is formed by a light-reflecting material, and include the layer formed with the scan lines 24, the layer formed with the signal lines 25 and the wirings 90, and the reflective layer 80, in the embodiment. The metal layers of the embodiment do not include the drive electrode COML, which is formed of the transparent electrode. Areas of the layers refer to areas of the metals formed in the corresponding layers, and comparison is made among the area of the scan lines 24, the area of the signal lines 25 and the wirings 90, and the area of the reflective layer 80.

Providing the reflective layer 80 having the largest area in both the area overlapping the first line segment A1 and the area overlapping the second line segment A2 allows the display device 1 to reflect most light L1 of light emitted from the backlight 6 toward the black matrix 76a on the reflective layer 80 as light L2, as illustrated in FIG. 6. The light L2 reflected on the reflective layer 80 can be reflected at various parts, such as the backlight 6, located nearer to the backlight 6 than the reflective layer 80 so as to be light L3 going toward the color filter 76. The light L3 changes the light path by being reflected so as to be incident light to the open portions 76b. Thereby, the light L3 passes through the open portions 76b and is emitted from the display area portion 21 to an outside area. Partial light L4 of the light emitted from the backlight 6 toward the black matrix 76a is absorbed by the reflective layer 80.

In this manner, providing the reflective layer 80 allows the display device 1 to reflect the incident light to the area overlapping the black matrix 76a on the reflective layer 80 and thus to suppress absorption of the light by the black matrix 76a. The suppressing the absorption of the light by the black matrix 76a in this manner leads to a possibility of using the incident light from the backlight 6 at a high efficiency. In case that an increase in definition causes an increase in a range of the black matrix 76a and thus a reduction in an aperture ratio, the absorption of the light by the black matrix 76a can also be suppressed, so that more light can be emitted from the open portions 76b. This leads to a possibility of using the light efficiently and thus displaying a brighter image in case that the definition is increased.

Like the embodiment, providing the reflective layer 80 in a substantially whole region of the area overlapping the first line segment A1 and the area overlapping the second line segment A2 allows the display device 1 to suppress the absorption of the light by the black matrix 76a more reliably and increase the efficiency. The substantially whole region of the area overlapping the first line segment A1 and the area overlapping the second line segment A2 refers to a region provided with gaps enough to prevent the reflective layer 80 from being exposed from the area overlapping the first line segment A1 and the area overlapping the second line segment A2 due to, for example, errors in manufacturing. In the display device 1, each of the metal layers is disposed in the region in which the area overlapping the first line segment A1 and the area overlapping the second line segment A2 are provided with the gaps so as to prevent the metal from being exposed due to errors in manufacturing.

Forming the reflective layer 80 with the metal layer having a higher reflectance than those of the metal layer forming the scan line 24 and the metal layer forming the signal line 25 allows the display device 1 to reflect the light L1 at a higher percentage. Forming the reflective layer 80 with the metal layer having a high reflection property made of, for example, silver (Ag), aluminum (Al), or an aluminum alloy (Al alloy) allows the display device 1 to reflect the light L1 at a higher percentage.

While the reflective layer is formed with one film in the embodiment, a collective body of films formed into separate layers may be used as the reflective layer.

In the display device 1, a parasitic capacitance between the signal line and the scan line can be reduced by segmenting the reflective layer 80. Specifically, segmenting the reflective layer 80 at a boundary of the position where the first line segment A1 and the second line segment A2 overlap each other can reduce the parasitic capacitance between the signal line and the reflective layer 80, and the parasitic capacitance the scan line and the reflective layer 80. Providing the reflective layer 80 that is a different metal layer from those of the signal line and the scan line can shield light to the transistor element and improve defects caused by leakage, such as flicker, crosstalk, and stripes and unevenness. It is preferable that each of the gaps formed by segmenting of the reflective layer 80 has the minimum width within a range sufficient to be capable of maintaining the metal layers segmented from each other in an electrically separated state. This allows the reflective layer 80 to be disposed in a wider area.

In the display device 1, providing the reflective layer 80 on the base plate (transparent base plate) of the TFT substrate 71 allows the reflective layer 80 to be a metal layer nearest to the backlight 6 among the metal layers. This allows the reflective layer 80 to reflect the light efficiently. This effect can be obtained more preferably by particularly making the reflective layer 80 of a metal layer having the highest reflectance as described above. Consequently, the reflective layer 80 is preferably a metal layer nearest to the backlight 6 among the metal layers. However, the reflective layer 80 is not limited to this.

Figure 7:
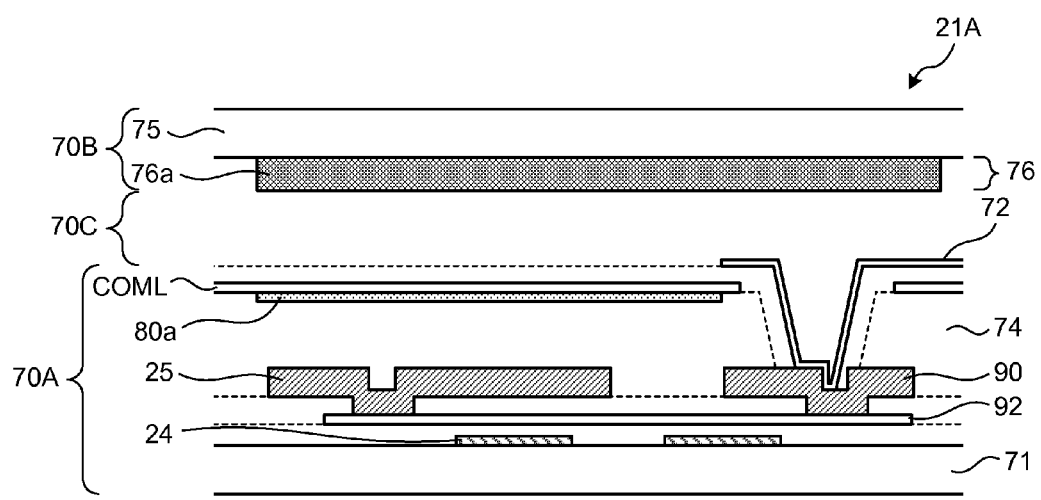
FIG. 7 is a cross-sectional view illustrating a modification of the circuit pattern of the display device.

FIG. 7 is a cross-sectional view illustrating a modification of the circuit pattern of the display device. A display area portion 21A illustrated in FIG. 7 has the same configuration as that of the display area portion 21 except the position of a reflective layer 80a. A description will be made below of items specific to the display area portion 21A. In the display area portion 21A, the reflective layer 80a is disposed in contact with the drive electrode COML. The reflective layer 80a is disposed in the same region as that of the reflective layer 80 when viewed from a direction orthogonal to a surface of the display area portion 21A. The reflective layer 80a is an auxiliary metal wiring layer for the drive electrode COML. In this way, the same effect as above can also be obtained by disposing, as described above, the reflective layer 80a used as a part of the electrode in the same region as that of the reflective layer 80 when viewed from a direction orthogonal to a surface of the display area portion 21. The reflective layer 80a is disposed nearer than the scan line 24 and the signal line 25 to the color filter 76, so that a part of the incident light from the backlight 6 is reflected by the scan line 24 and the signal line 25. This may lead to a lower efficiency than that of the display area portion 21 depending on the relation between the reflectance of the reflective layer 80a and the reflectance of the scan line 24 and the signal line 25.

Figure 8:
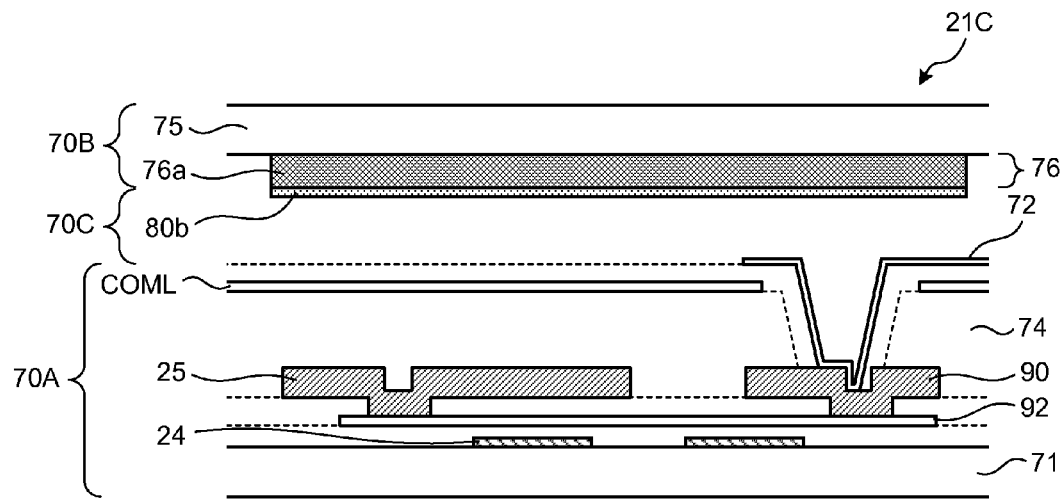
FIG. 8 is a cross-sectional view illustrating a modification of the circuit pattern of the display device.

FIG. 8 is a cross-sectional view illustrating a modification of the circuit pattern of the display device. A display area portion 21C illustrated in FIG. 8 has the same configuration as that of the display area portion 21 except the position of a reflective layer 80b. A description will be made below of items specific to the display area portion 21C. In the display area portion 21C, the reflective layer 80b is disposed in contact with a surface of the black matrix 76a of the color filter 76 on the side of the TFT substrate 71. The reflective layer 80b is disposed in the same region as that of the reflective layer 80 when viewed from a direction orthogonal to a surface of the display area portion 21C. In this way, the same effect as above can also be obtained by disposing, as described above, the reflective layer 80b disposed in contact with the black matrix 76a in the same region as that of the reflective layer 80 when viewed from the direction orthogonal to the surface of the display area portion 21. In addition, providing the reflective layer 80b in contact with the black matrix 76a allows the display area portion 21C to suppress occurrence of a position gap between the black matrix 76a and the reflective layer 80b. Thus, the black matrix 76a and the reflective layer 80b lie adjacent to each other. Therefore, the gap from the region of the black matrix 76a to the region of the reflective layer 80b can be smaller, so that the arrangement area of the reflective layer 80b can be larger.

The display device of the above-described embodiment can obtain the effects described above preferably by providing the metal layer having the largest area in both the area overlapping the first line segment A1 and the area overlapping the second line segment A2 as a metal layer different from the layer formed with the scan line 24 and the layer formed with the signal line 25 and the wiring 90. However, the present disclosure is not limited to this. The layer formed with the scan line 24 or the layer formed with the signal line 25 and the wiring 90 may be the metal layer having the largest area in both the area overlapping the first line segment A1 and the area overlapping the second line segment A2.

Figure 9:
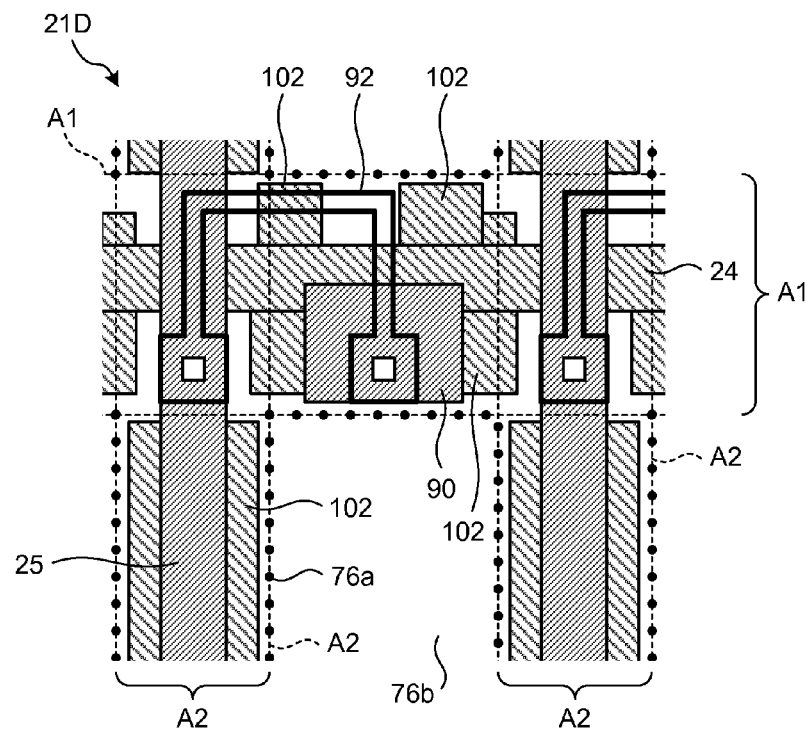
FIG. 9 is a front view illustrating a schematic configuration of a modification of the circuit pattern of the display device.

FIG. 9 is a front view illustrating a schematic configuration of a modification of the circuit pattern of the display device. A display area portion 21D illustrated in FIG. 9 has the same configuration as that of the display area portion 21 except that the metal layer having the largest area in both the area overlapping the first line segment A1 and the area overlapping the second line segment A2 is the layer formed with the scan line 24. A description will be made below of items specific to the display area portion 21D. The display area portion 21D includes a metal layer 102 provided in the layer formed with the scan line 24. The metal layer 102 is disposed in the area overlapping the second line segment A2, that is, in the area in which the signal line 25 is arranged. The metal layer 102 is disposed at a larger area than that of the signal line 25 in the area overlapping the second line segment A2. The metal layer 102 is also disposed in the area overlapping the first line segment A1. In other words, the display area portion 21D includes the metal layer 102 disposed in an area not provided with the scan line 24. This can increase the area provided with the metal layer formed with the scan line 24, in the area overlapping the first line segment A1. The metal layers 102 are disposed within a range of maintaining the state in which the scan lines 24 are separated from each other.

The display area portion 21D can also obtain the same effects as those of the above-described embodiment by providing, as described above, the metal layer having the largest area in both the area overlapping the first line segment A1 and the area overlapping the second line segment A2 as the layer formed with the scan line 24. The metal layers 102 can be formed at the time of forming the scan lines 24 that need to be formed in the display area portion 21D. It is possible to suppress the increase of the production process. Using the layer formed with the scan line 24 as the metal layer having the largest area brings about a certain degree of restriction on the arrangement of the metal layers 102 so as to maintain the function of the scan line 24.

Figure 10:
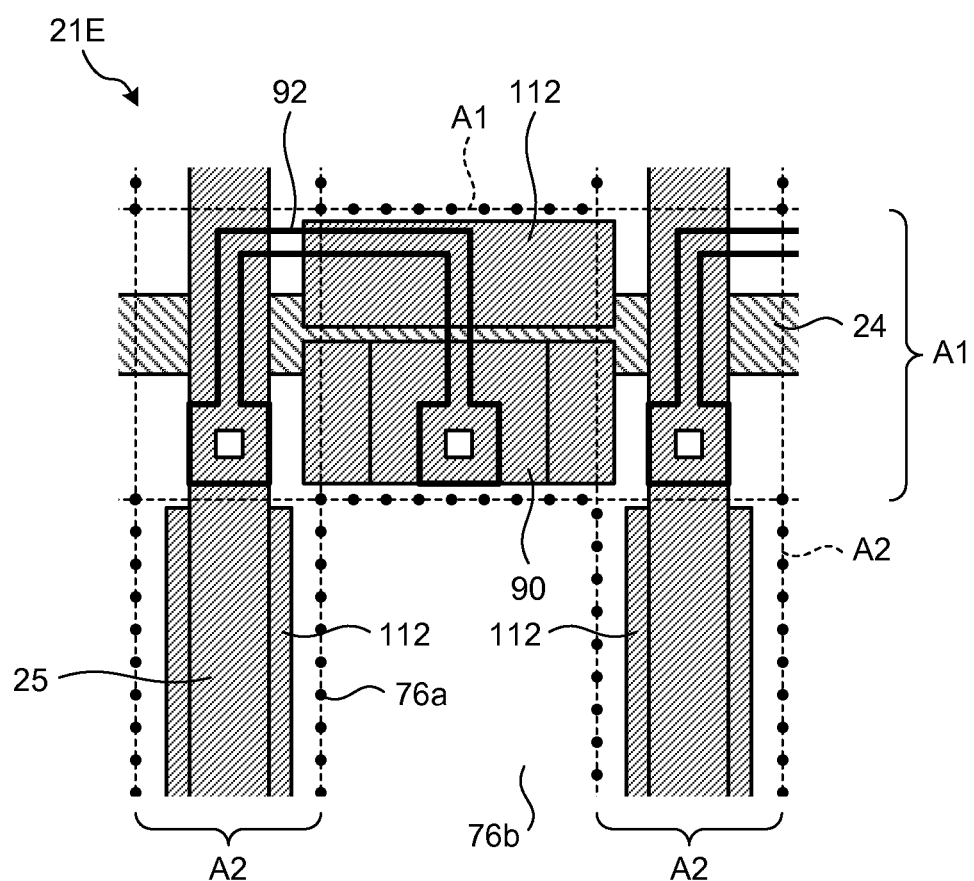
FIG. 10 is a front view illustrating a schematic configuration of a modification of the circuit pattern of the display device.

FIG. 10 is a front view illustrating a schematic configuration of a modification of the circuit pattern of the display device. A display area portion 21E illustrated in FIG. 10 has the same configuration as that of the display area portion 21 except that the metal layer having the largest area in both the area overlapping the first line segment A1 and the area overlapping the second line segment A2 is the layer formed with the signal line 25. A description will be made below of items specific to the display area portion 21E. The display area portion 21E includes a metal layer 112 provided in the layer formed with the signal line 25. The metal layer 112 is disposed in the area overlapping the first line segment A1, that is, in the area in which the scan line 24 is arranged. The metal layer 112 is disposed at a larger area than that of the scan line 24 in the area overlapping the first line segment A1. The metal layer 112 is also disposed in the area overlapping the second line segment A2. In other words, the display area portion 21E includes the metal layer 112 disposed in an area not provided with the signal line 25. This can increase the area provided with the metal layer formed with the signal line 25, in the area overlapping the second line segment A2. The metal layers 112 are disposed within a range of maintaining the state in which the signal lines 25 are separated from each other.

The display area portion 21E can also obtain the same effects as those of the above-described embodiment by providing, as described above, the metal layer having the largest area in both the area overlapping the first line segment A1 and the area overlapping the second line segment A2 as the layer formed with the signal line 25. The metal layers 112 can be formed at the time of forming the signal lines 25 that need to be formed in the display area portion 21E. It is possible to suppress the increase of the production process. Using the layer formed with the signal line 25 as the metal layer having the largest area brings about a certain degree of restriction on the arrangement of the metal layers 112 so as to maintain the function of the signal line 25.

While, in the above-described embodiment, the black matrix 76a has the grid shape formed by intersection of lines in two directions orthogonal to each other, the black matrix 76a is not limited to this shape. The grid of the black matrix may be formed by curves, or by shapes having widths that vary depending on positions when viewed from the direction orthogonal to the surface of the display area portion. In other words, each of the first line segment and the second line segment may be a curve, or may have a shape having a width that varies depending on the position. In either case, a portion where the first line segment overlaps the second line segment is formed only by connecting intersections between sides of the first line segment and sides of the second line segment. In the present case, two points only need to be connected by a straight line.

Figure 11:
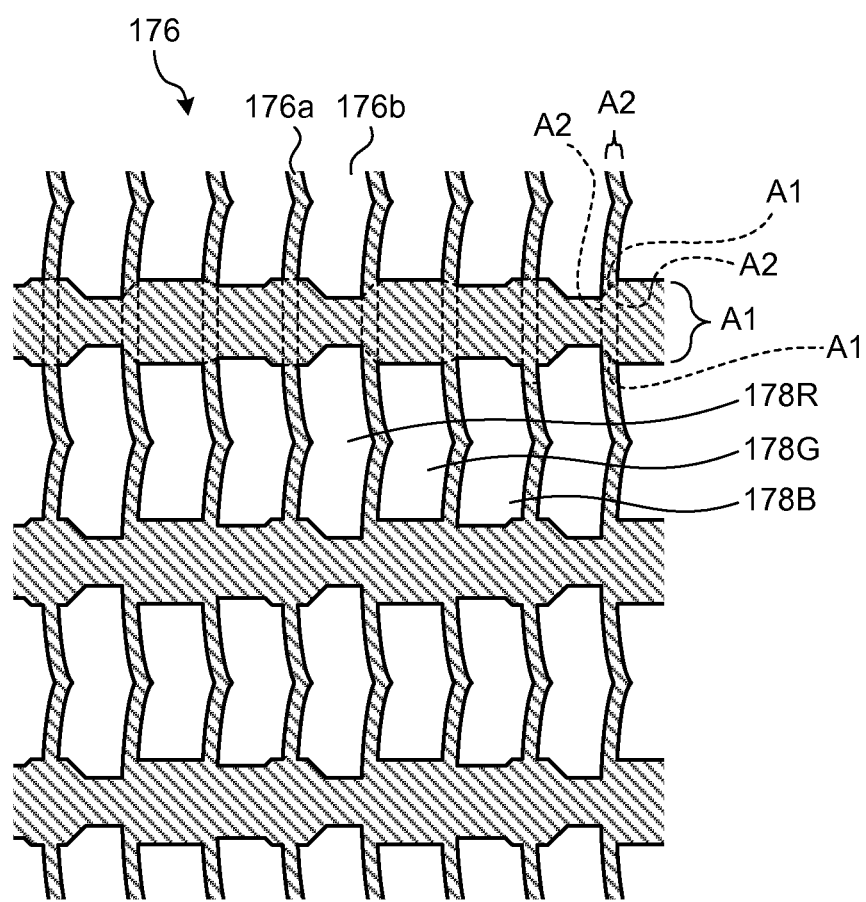
FIG. 11 is a front view illustrating a schematic configuration of a modification of a color filter of the display device.
Figure 12:
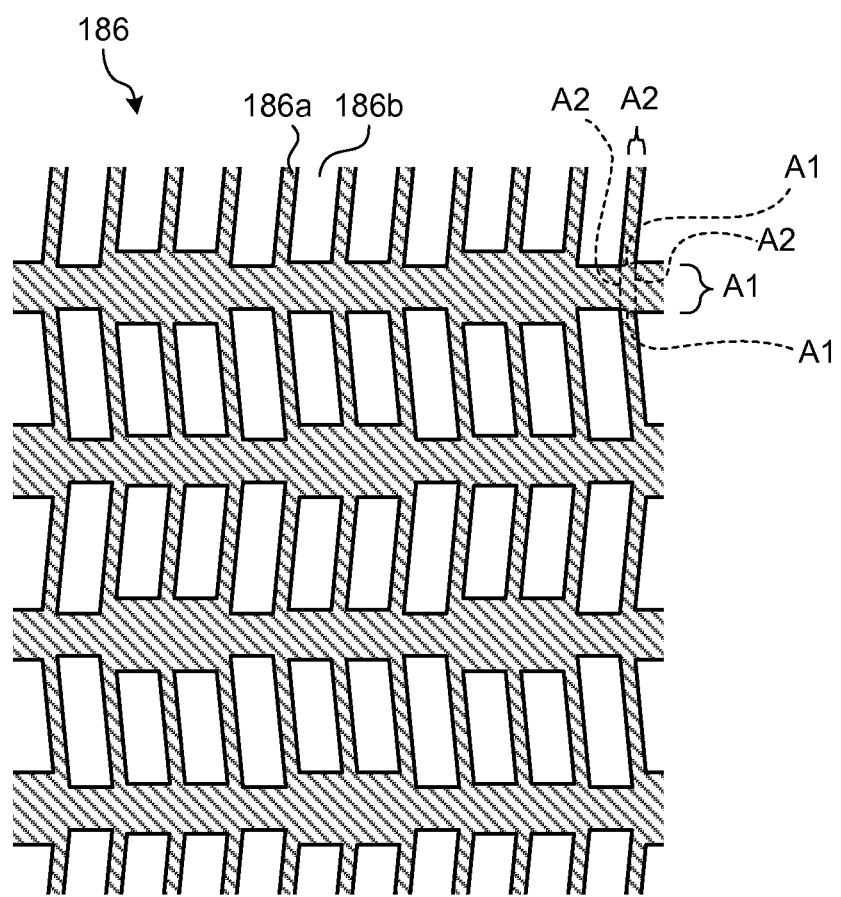
FIG. 12 is a front view illustrating a schematic configuration of a modification of the color filter of the display device.

FIGS. 11 and 12 are each a front view illustrating a schematic configuration of a modification of the color filter of the display device. In a color filter 176 illustrated in FIG. 11, the first line segment A1 of a black matrix 176a has a shape having a width that varies depending on the position. On the color filter 176, the second line segment A2 of the black matrix 176a has a curved shape that is kinked halfway of an open portion 176b (open portion 178R, 178G, or 178B of a filter of each color). In a color filter 186 illustrated in FIG. 12, the first line segment A1 of a black matrix 186a has a shape having a width that varies depending on the position. On the color filter 186, the second line segment A2 of the black matrix 186a has a shape that changes the direction thereof in each portion where the open portion 176b is changed, that is, in each portion where the second line segment A2 passes through the first line segment A1.

In both cases of using the color filter 176 illustrated in FIG. 11 and using the color filter 186 illustrated in FIG. 12, the display device can also obtain the above described various effects by making the metal layer having the largest area in the area overlapping the first line segment of the black matrix the same metal layer as the metal layer having the largest area in the area overlapping the second line segment of the black matrix. The various effects can also be obtained by preferably shaping the metal layer that has the largest area in the area overlapping the first line segment and the largest area in the area overlapping the second line segment, as described above.

While each example of the display device of the above-described embodiment has the configuration in which the grid-like black matrix is formed on the color filter of the display area portion, and divides an opening into the matrix-like open portions corresponding to the pixels, the display device is not limited to this configuration. The display device only needs to be provided with a grid-like non-open portion that divides an opening into matrix-like open portions corresponding to pixels. The non-open portion is an area serving as boundaries of the open portions, and is formed of a material that does not transmit light, or has a low optical transmittance. Specifically, the metal layer used as wirings, etc., or the black matrix forms a role as the non-open portion. The non-open portion preferably does not transmit light. In the display device, the first line segments extending in the first direction and the second line segments extending in the second direction intersecting the first direction intersect each other and are arranged in a grid to form the non-open portion. Among the metal layers that are disposed on the non-open portion, the metal layer having the largest area in an area overlapping the first line segment is the same as the metal layer having the largest area in an area overlapping the second line segment. Thus, the effects described above can be obtained.

2. Application Examples

Next, with reference to FIGS. 13 to 24, a description will be made of application examples of the display device 1 described in the embodiment. FIGS. 13 to 24 are diagrams each illustrating an example of the electronic apparatus to which the display device according to the embodiment is applied. The display device 1 according to the embodiment can be applied to electronic apparatuses of all fields, such as television devices, digital cameras, notebook type personal computers, portable electronic apparatus including mobile phones, and video cameras. In other words, the display device 1 according to the embodiment can be applied to electronic apparatuses of all fields that display externally received video signals or internally generated video signals as images or video pictures. The electronic apparatus includes a control device that supplies the video signals to the display device, and controls operations of the display device.

2-1. Application Example 1

Figure 13:
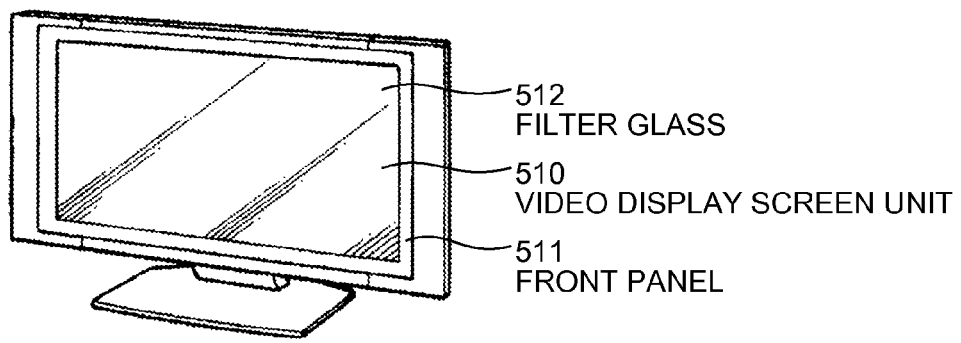
FIG. 13 is a diagram illustrating an example of an electronic apparatus to which the display device according to the embodiment is applied.

The electronic apparatus illustrated in FIG. 13 is a television device to which the display device 1 according to the embodiment is applied. This television device includes, for example, a video display screen unit 510 that includes a front panel 511 and a filter glass 512. The video display screen unit 510 is the display device according to the embodiment.

2-2. Application Example 2

Figure 14:
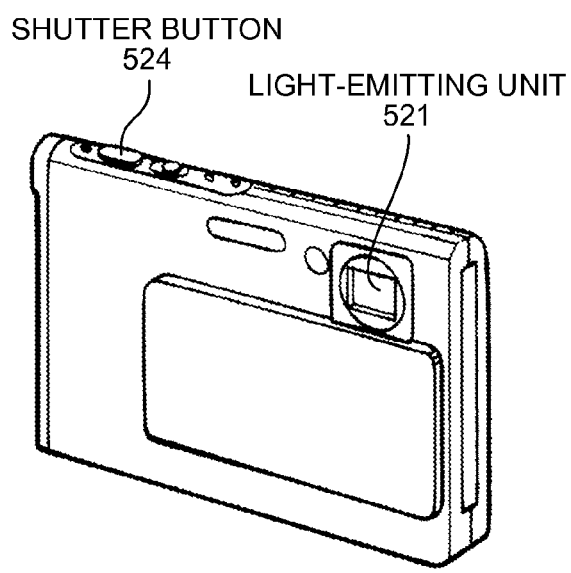
FIG. 14 is a diagram illustrating an example of the electronic apparatus to which the display device according to the embodiment is applied.
Figure 15:
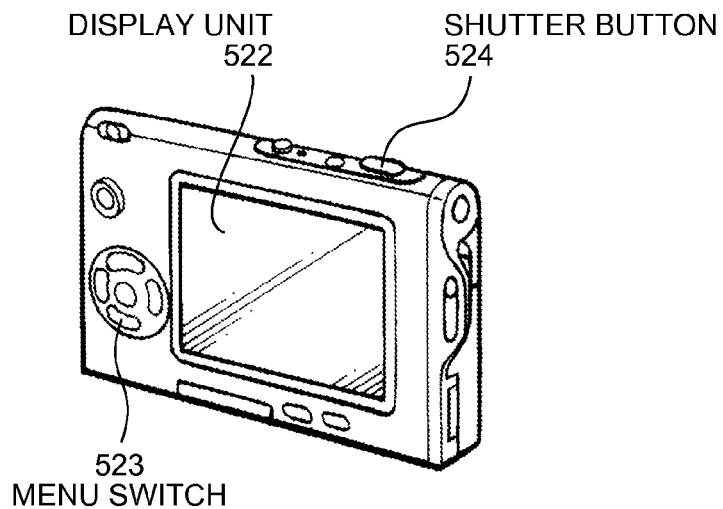
FIG. 15 is a diagram illustrating an example of the electronic apparatus to which the display device according to the embodiment is applied.

The electronic apparatus illustrated in FIGS. 14 and 15 is a digital camera to which the display device 1 according to the embodiment is applied. This digital camera includes, for example, a light-emitting unit 521 for flash, a display unit 522, a menu switch 523, and a shutter button 524. The display unit 522 is the display device according to the embodiment.

2-3. Application Example 3

Figure 16:
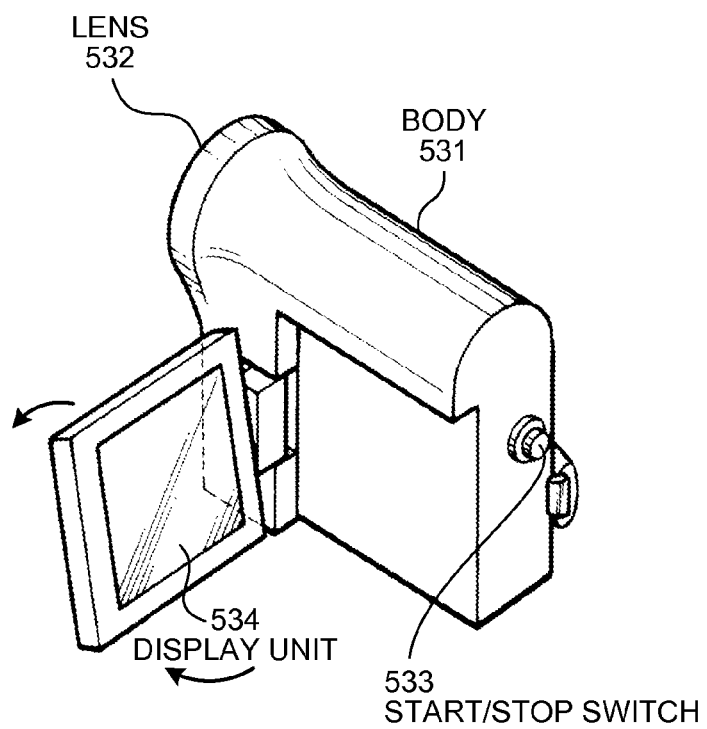
FIG. 16 is a diagram illustrating an example of the electronic apparatus to which the display device according to the embodiment is applied.

The electronic apparatus illustrated in FIG. 16 represents an external appearance of a video camera to which the display device 1 according to the embodiment is applied. This video camera includes, for example, a body 531, a lens 532 for capturing a subject provided on the front side face of the body 531, and a start/stop switch 533 and a display unit 534 that are used during shooting. The display unit 534 is the display device according to the embodiment.

2-4. Application Example 4

Figure 17:
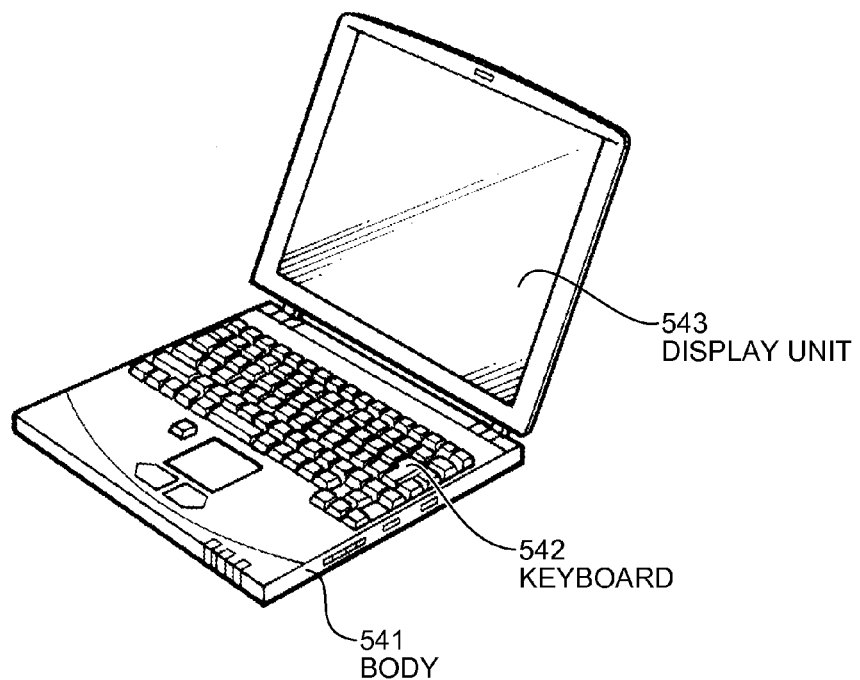
FIG. 17 is a diagram illustrating an example of the electronic apparatus to which the display device according to the embodiment is applied.
Figure 18:
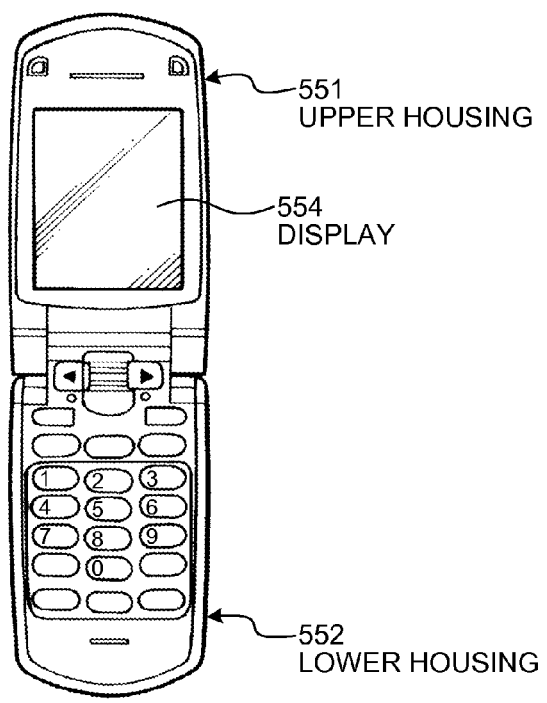
FIG. 18 is a diagram illustrating an example of the electronic apparatus to which the display device according to the embodiment is applied.
Figure 19:
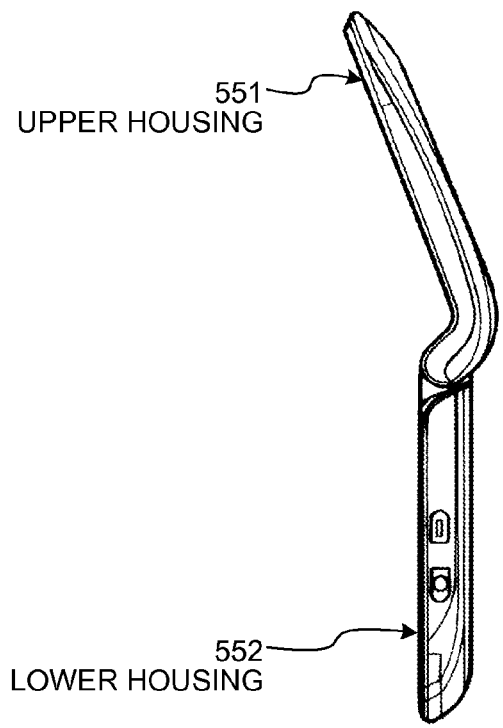
FIG. 19 is a diagram illustrating an example of the electronic apparatus to which the display device according to the embodiment is applied.
Figure 20:
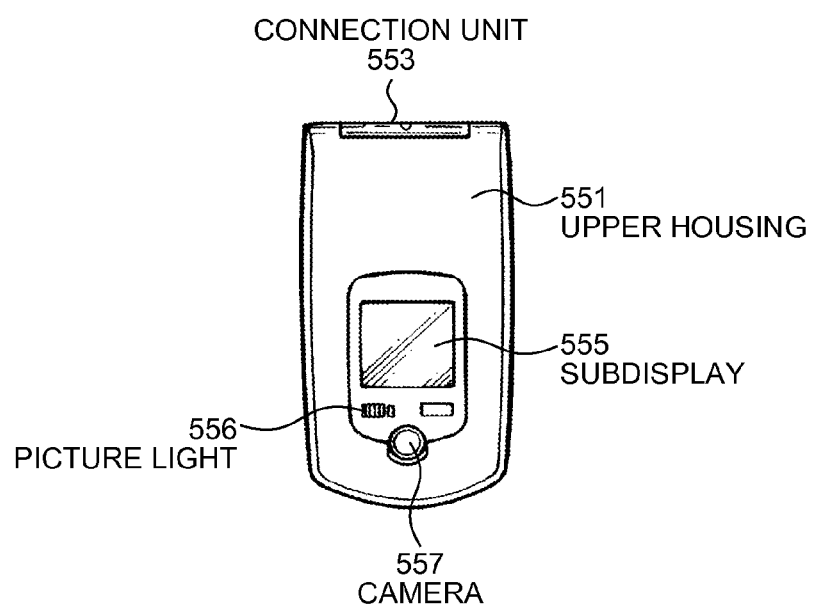
FIG. 20 is a diagram illustrating an example of the electronic apparatus to which the display device according to the embodiment is applied.
Figure 21:
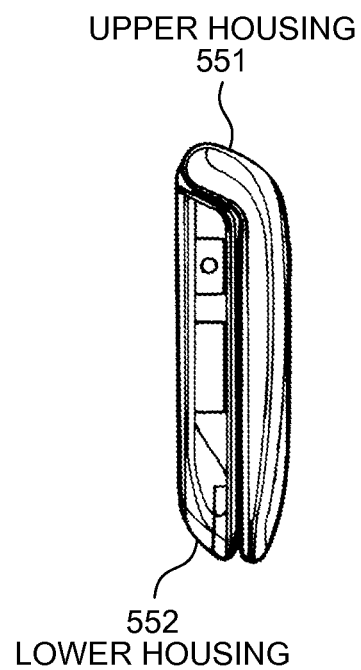
FIG. 21 is a diagram illustrating an example of the electronic apparatus to which the display device according to the embodiment is applied.
Figure 22:
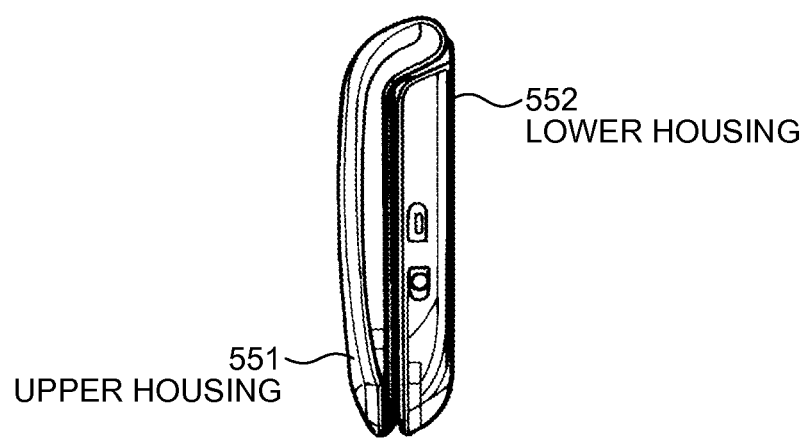
FIG. 22 is a diagram illustrating an example of the electronic apparatus to which the display device according to the embodiment is applied.
Figure 23:
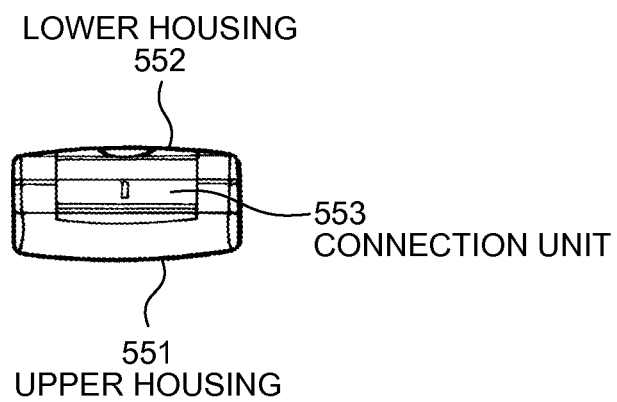
FIG. 23 is a diagram illustrating an example of the electronic apparatus to which the display device according to the embodiment is applied.
Figure 24:
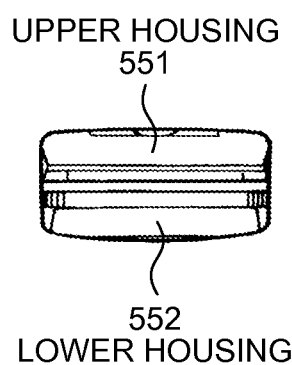
FIG. 24 is a diagram illustrating an example of the electronic apparatus to which the display device according to the embodiment is applied.

The electronic apparatus illustrated in FIG. 17 is a notebook type personal computer to which the display device 1 according to the embodiment is applied. This notebook type personal computer includes, for example, a body 541, a keyboard 542 for input operation of characters, etc., and a display unit 543 that displays images. The display unit 543 is constituted by the display device according to the embodiment.

2-5. Application Example 5

The electronic apparatus illustrated in FIGS. 18 to 24 is a mobile phone to which the display device 1 according to the embodiment is applied. This mobile phone is, for example, composed of an upper housing 551 and a lower housing 552 connected to each other with a connection unit (hinge unit) 553, and includes a display 554, a subdisplay 555, a picture light 556, and a camera 557. The display 554 and/or the subdisplay 555 are constituted by the display device according to the embodiment.

3. Aspects of Present Disclosure

The present disclosure includes the following aspects:
(1) A display device comprising:
  a display area portion in which a plurality of first line segments extending in a first direction and a plurality of second line segments extending in a second direction intersecting the first direction intersect each other and are arranged in a grid to form a non-open portion that divides a light-transmitting opening into open portions, and the open portions divided by the non-open portion in a matrix form pixels arranged in a matrix;
  a vertical drive circuit that applies vertical scan pulses to scan lines and selects pixels in the display area portion row by row; and
  a horizontal drive circuit that supplies an image signal to each of the pixels of a row selected by the vertical drive circuit, wherein
    the display area portion comprises:
      a color filter in which a colored filter is arranged corresponding to the open portions of the pixels; and
      a plurality of metal layers that are formed on the color filter and disposed in positions overlapping the non-open portion when viewed from a surface of the display area portion,
    a metal layer having the largest area in areas overlapping the plurality of first line segments among the plurality of metal layers is the same as a metal layer having the largest area in areas overlapping the plurality of second line segments among the plurality of metal layers, and
    the metal layer that has the largest area in the areas overlapping the plurality of first line segments and the largest area in the areas overlapping the plurality of second line segments is formed of a metal layer having the highest reflectance among the plurality of metal layers.
(2) The display device according to (1), wherein
  the color filter comprises a black matrix arranged in a grid; and
  an area where the black matrix is arranged forms a role as the non-open portion.
(3) The display device according to (1), wherein the plurality of metal layers comprise:
  a first wiring layer having first wirings that are connected to the vertical drive circuit and are arranged along the first line segments; and
  a second wiring layer having second wirings that are connected to the horizontal drive circuit and are arranged along the second line segments.
(4) The display device according to (3), wherein
  the plurality of metal layers comprise a reflective layer that is a layer different from the first wiring layer and the second wiring layer; and
  the reflective layer has the metal layer that has the largest area in the areas overlapping the first line segments and the largest area in the areas overlapping the second line segments among the metal layers.
(5) The display device according to (4), further comprising a transparent substrate disposed at an end on the side from which light enters, wherein
  the reflective layer is in contact with a surface on the color filter side of the transparent substrate.
(6) The display device according to (4), further comprising a common electrode formed of a transparent electrode, wherein
  the reflective layer is in contact with the common electrode.
(7) The display device according to (4), wherein the reflective layer is in contact with the color filter.
(8) The display device according to (4), wherein the reflective layer has gaps formed at intersections between the first line segments and the second line segments.
(9) An electronic apparatus having the display device; and a control device that supplies an input signal to the display device, the display device comprising:
  a display area portion in which a plurality of first line segments extending in a first direction and a plurality of second line segments extending in a second direction intersecting the first direction intersect each other and are arranged in a grid to form a non-open portion that divides a light-transmitting opening into open portions, and the open portions divided by the non-open portion in a matrix form pixels arranged in a matrix;
  a vertical drive circuit that applies vertical scan pulses to scan lines and selects pixels in the display area portion row by row; and
  a horizontal drive circuit that supplies an image signal to each of the pixels of a row selected by the vertical drive circuit, wherein
    the display area portion comprises:
      a color filter in which a colored filter is arranged corresponding to the open portions of the pixels; and
      a plurality of metal layers that are formed on the color filter and disposed in positions overlapping the non-open portion when viewed from a surface of the display area portion,
    a metal layer having the largest area in areas overlapping the plurality of first line segments among the plurality of metal layers is the same as a metal layer having the largest area in areas overlapping the plurality of second line segments among the plurality of metal layers, and
    the metal layer that has the largest area in the areas overlapping the plurality of first line segments and the largest area in the areas overlapping the plurality of second line segments is formed of a metal layer having the highest reflectance among the plurality of metal layers.

A display device and an electronic apparatus according to the present disclosure can efficiently use light emitted from a backlight by setting the reflectance of a metal layer having the largest area higher than that of the other metal layers.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:
1. A display device comprising:
  a display area portion in which a plurality of first line segments extending in a first direction and a plurality of second line segments extending in a second direction intersecting the first direction intersect each other and are arranged in a grid to form a non-open portion that divides a light-transmitting opening into open portions, and the open portions divided by the non-open portion in a matrix form pixels arranged in a matrix;
  a vertical drive circuit that applies vertical scan pulses to scan lines and selects pixels in the display area portion row by row; and a horizontal drive circuit that supplies an image signal to each of the pixels of a row selected by the vertical drive circuit, wherein
the display area portion comprises:
   a color filter in which a colored filter is arranged corresponding to the open portions of the pixels; and
   a plurality of metal layers that are formed on the color filter and disposed in positions overlapping the non-open portion when viewed from a surface of the display area portion,
a metal layer having the largest area in areas overlapping the plurality of first line segments among the plurality of metal layers is the same as a metal layer having the largest area in areas overlapping the plurality of second line segments among the plurality of metal layers, and
the metal layer that has the largest area in the areas overlapping the plurality of first line segments and the largest area in the areas overlapping the plurality of second line segments is formed of a metal layer having the highest reflectance among the plurality of metal layers,
wherein
the color filter comprises a black matrix arranged in a grid,
an area where the black matrix is arranged forms a role as the non-open portion,
the first direction is a direction along a scan line,
the second direction is a direction along a data line,
each of the first line segments is a portion of the black matrix which extends in the first direction, and
each of the second line segments is a portion of the black matrix which extends in the second direction.

2. The display device according to claim 1, wherein the plurality of metal layers comprise:
   a first wiring layer having first wirings that are connected to the vertical drive circuit and are arranged along the first line segments; and
   a second wiring layer having second wirings that are connected to the horizontal drive circuit and are arranged along the second line segments.

3. The display device according to claim 2, wherein
the plurality of metal layers comprise a reflective layer that is a layer different from the first wiring layer and the second wiring layer; and
the reflective layer has the metal layer that has the largest area in the areas overlapping the first line segments and the largest area in the areas overlapping the second line segments among the metal layers.

4. The display device according to claim 3, further comprising a transparent substrate disposed at an end on the side from which light enters, wherein
the reflective layer is in contact with a surface on the color filter side of the transparent substrate.

5. The display device according to claim 3, further comprising a common electrode formed of a transparent electrode, wherein
the reflective layer is in contact with the common electrode.

6. The display device according to claim 3, wherein the reflective layer is in contact with the color filter.

7. The display device according to claim 3, wherein the reflective layer has gaps formed at intersections between the first line segments and the second line segments.

8. An electronic apparatus having the display device and a control device that supplies an input signal to the display device, the display device comprising:
   a display area portion in which a plurality of first line segments extending in a first direction and a plurality of second line segments extending in a second direction intersecting the first direction intersect each other and are arranged in a grid to form a non-open portion that divides a light-transmitting opening into open portions, and the open portions divided by the non-open portion in a matrix form pixels arranged in a matrix;
   a vertical drive circuit that applies vertical scan pulses to scan lines and selects pixels in the display area portion row by row; and
   a horizontal drive circuit that supplies an image signal to each of the pixels of a row selected by the vertical drive circuit, wherein
the display area portion comprises:
   a color filter in which a colored filter is arranged corresponding to the open portions of the pixels; and
   a plurality of metal layers that are formed on the color filter and disposed in positions overlapping the non-open portion when viewed from a surface of the display area portion,
a metal layer having the largest area in areas overlapping the plurality of first line segments among the plurality of metal layers is the same as a metal layer having the largest area in areas overlapping the plurality of second line segments among the plurality of metal layers, and
the metal layer that has the largest area in the areas overlapping the plurality of first line segments and the largest area in the areas overlapping the plurality of second line segments is formed of a metal layer having the highest reflectance among of the plurality of metal layers,
wherein
the color filter comprises a black matrix arranged in a grid,
an area where the black matrix is arranged forms a role as the non-open portion,
the first direction is a direction along a scan line,
the second direction is a direction along a data line,
each of the first line segments is a portion of the black matrix which extends in the first direction, and
each of the second line segments is a portion of the black matrix which extends in the second direction.

* * * * *